Oct. 21, 1924.    1,512,448
N. H. BLOOM
MANURE SPREADER AND FEED MECHANISM THEREFOR
Filed Nov. 10, 1921    4 Sheets-Sheet 1
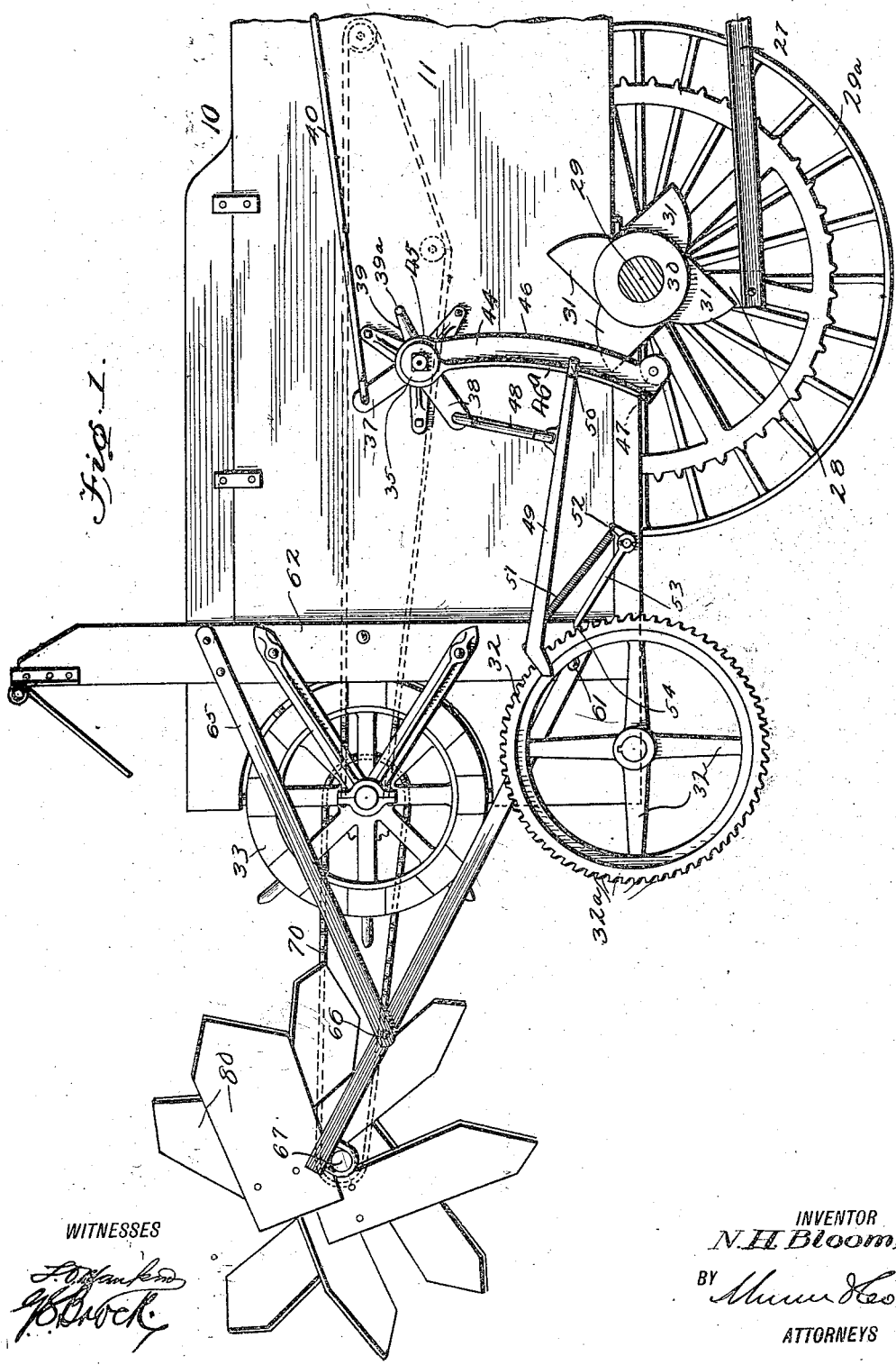
WITNESSES
INVENTOR
N. H. Bloom,
BY
ATTORNEYS

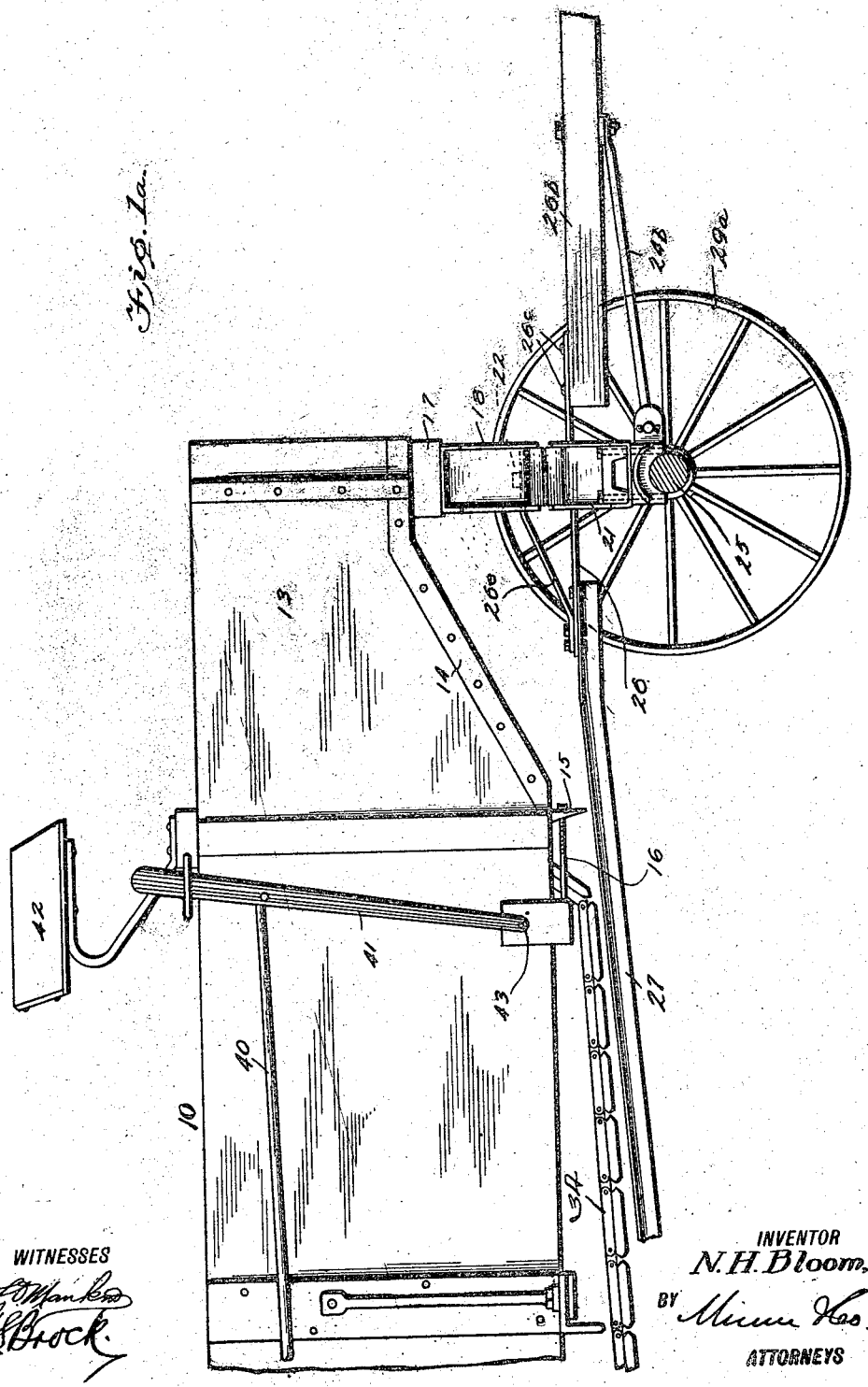

Oct. 21, 1924.  1,512,448
N. H. BLOOM
MANURE SPREADER AND FEED MECHANISM THEREFOR
Filed Nov. 10, 1921    4 Sheets-Sheet 3
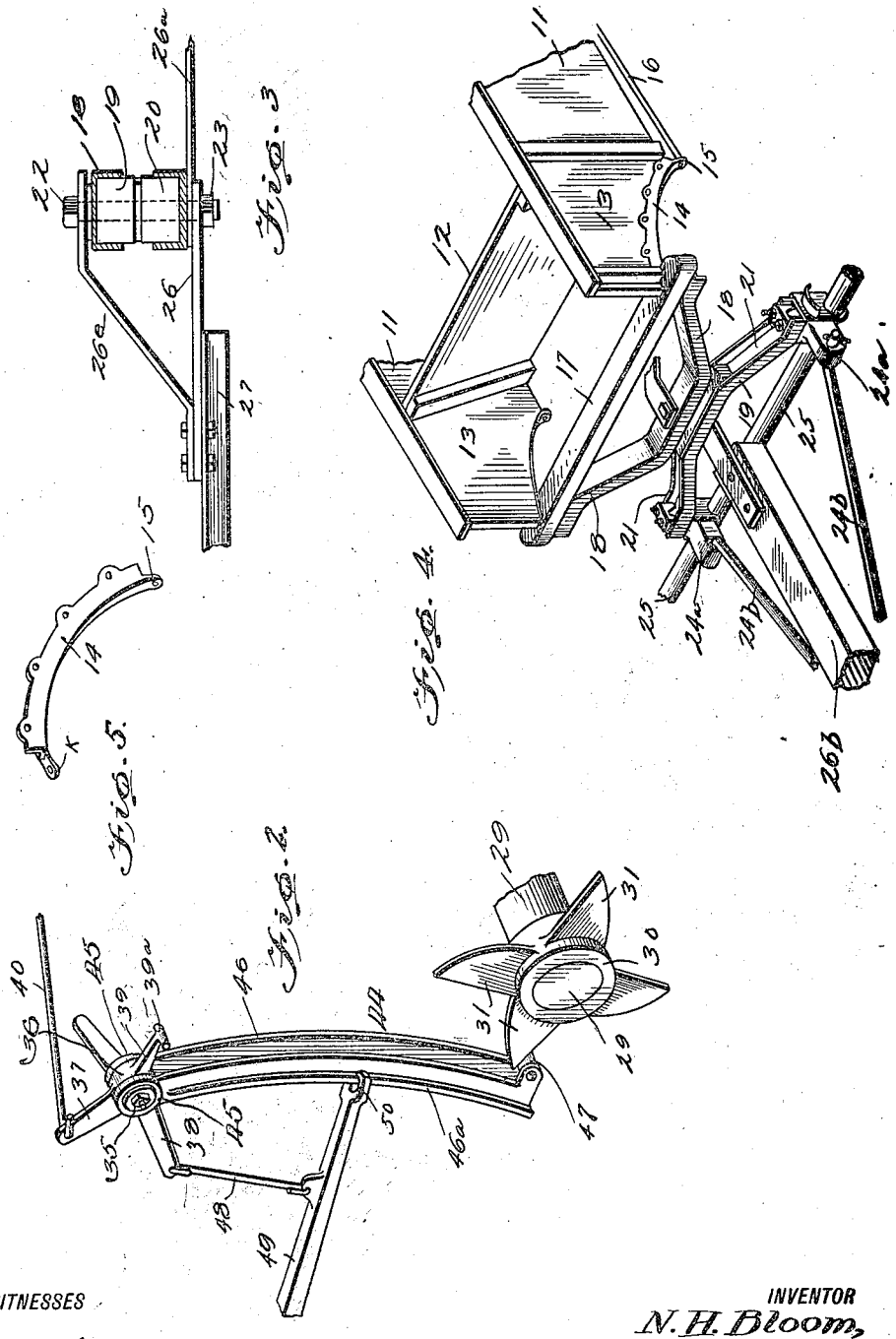
WITNESSES
INVENTOR
N. H. Bloom,
BY
ATTORNEYS

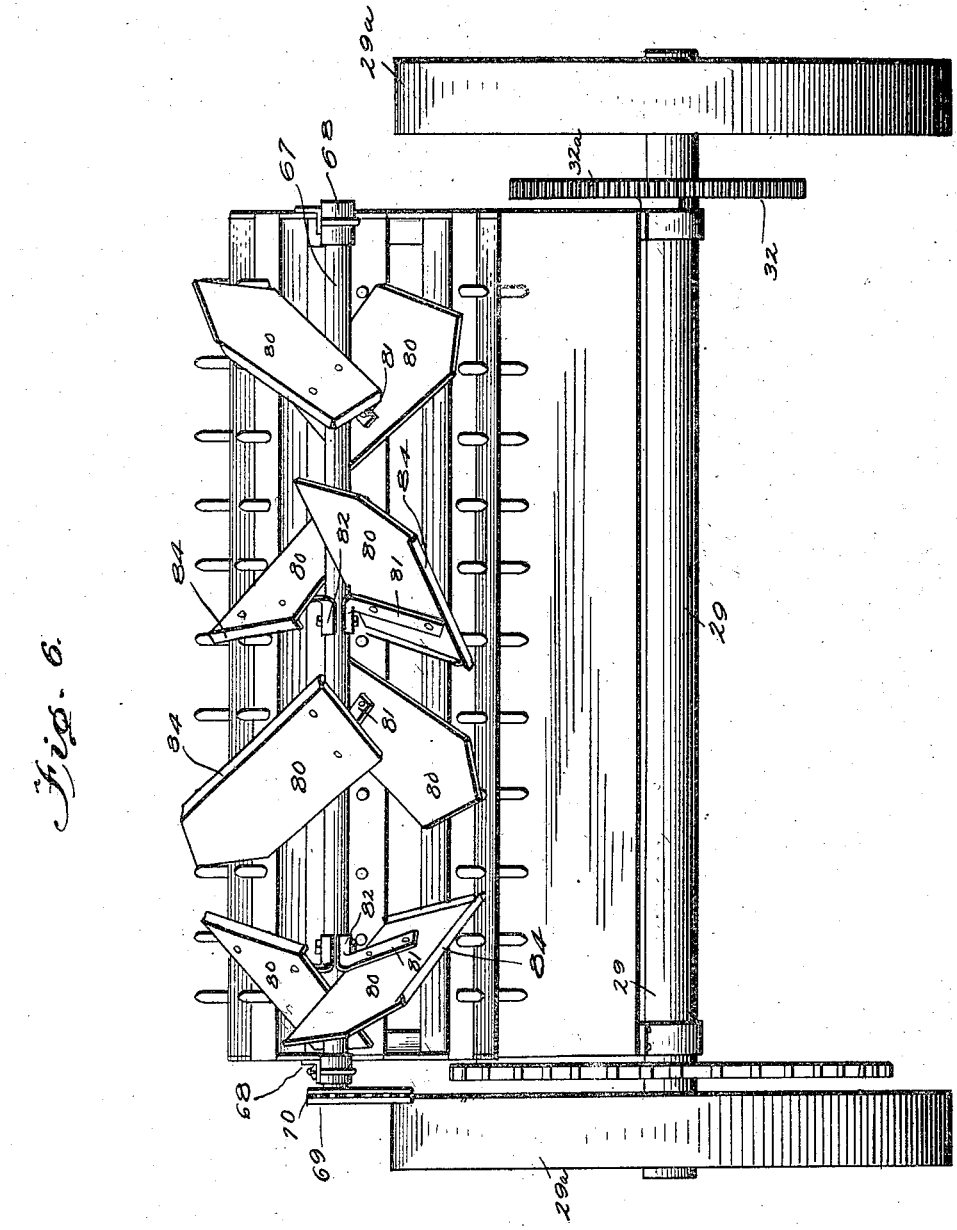

Patented Oct. 21, 1924.

1,512,448

UNITED STATES PATENT OFFICE.

NICHOLAS HENRY BLOOM, OF NASHUA, IOWA, ASSIGNOR TO THE BLOOM MANUFACTURING CO., OF NASHUA, IOWA, A CORPORATION OF IOWA.

MANURE SPREADER AND FEED MECHANISM THEREFOR.

Application filed November 10, 1921. Serial No. 514,220.

*To all whom it may concern:*

Be it known that I, NICHOLAS H. BLOOM, a citizen of the United States, and a resident of Nashua, in the county of Chickasaw and State of Iowa, have invented certain new and useful Improvements in Manure Spreaders and Feed Mechanism Therefor, of which the following is a specification.

This invention relates to manure spreaders of the type employing an endless conveyor or belt and a ratchet mechanism for operating the same to feed manure along the bed to a rotary beater or distributer and has particular reference to the front portion of the bed of the box the manner of attaching same to the front axle, the connections of the running gear with the front and rear axles, and to the ratchet feed mechanism; and also to auxiliary spreader, means for spreading laterally over a wide area beyond the width of the distributer.

In machines of this character, various variable speed mechanisms, have heretofore been employed for feeding manure to the distributing means fast or slowly as desired, so as to spread the requisite amount of manure over a given soil area, but these mechanisms have either been too costly for a low priced fertilizer or distributer, or, if of cheaper construction, have not been able to give the desired steady and continuous feed.

The primary object, therefore, of the invention is to provide a feed mechanism of the ratchet type which shall be simple and durable in construction, capable of adjustment for a reasonably wide range of feeds, in all of which the feed will be uniform and substantially continuous during traction of the spreader so that an even distribution of manure will always be obtained.

Another object is to provide a special form of box and connections between the same and the running gear and the front and rear axles.

Another object is to provide an auxiliary spreader whereby the material will be spread or scattered over a relatively wide area.

With these and other objects in view the invention consists in certain novel features of construction and arrangement of parts as will be hereinafter described and pointed out in the claims, reference being had to the accompanying drawings in which—

Figures 1 and 1ª show a side elevation of a manure spreader embodying my improvements;

Figure 2 is a perspective view of the essential elements of the variable feed mechanism;

Figure 3 is an enlarged vertical section through front portion of the under or running gear of the vehicle;

Figure 4 is a perspective view of the front portion of the device showing special formation of the wagon box and its connection to the front axle;

Figure 5 is a perspective view of one form of the front box bracing member and means for carrying the belt tightening means; and Figure 6 is a rear elevation showing the auxiliary spreader.

The fertilizer or manure box is of the general lowdown type and is designated generally by the reference character 10, the side-boards 11 of which however project forwardly ahead of the manure space which is limited at its front by the inclined gate or board 12. The extreme front ends of the side boards are tapered upwardly as shown at 13 and this tapering effect may be secured by narrowing the end portions 13 by having the lower edges cut on a straight oblique line as shown in Figure 1ª or on an upward curve as shown in Figure 4, and these edges are to be protected by an angle or malleable iron casting 14 embracing the sides and lower edge of the boards 13 and secured thereto, and having at their ends perforated lugs 15 the rear lug being adapted to receive the adjusting screw 16 of the conveyor tightening means.

The sill 17 at the front end of the box is supported on a downwardly arched bolster 18 made of channel iron or steel, and the inverted crown of this arch is provided with a filler block 19 which rests on a similar filler block 20 supported in the crown of the lower arched bolster or axletree 21, which is also of channel iron or steel. A king bolt 22 passes through the juxtaposed crowns and filling blocks and is held in place by a nut 23 on the lower threaded end thereof.

The outer ends of the axletree 21 are rigidly secured to bearing blocks 24 in which the front axle 25 is supported. These blocks 24 are provided with forwardly extending perforated ears 24ª to which are secured the rear ends of the front hounds 24ᵇ.

The under or running gear comprises a reach member 26 which has secured thereto rearwardly diverging hounds 27 of angle iron formation to the rear ends of which are secured the metallic brackets 28 (see Fig. 1), and these brackets are supported from the rear axle 29, to which is secured the star wheel cam 30 of the feed mechanism. The reach 26 is flexibly connected to the upper bolster by a brace 26e and king bolt 22, and to the lower bolster by said bolt and tongue extension 26a which is secured to the tongue 26b by the bolts 26c.

The variable feed mechanism which will now be more specifically set forth includes as an essential element the star wheel cam 30 hereinbefore mentioned, and which, as shown, includes a hub member and the radially disposed arms or tappets 31 projecting therefrom, one edge thereof being straight and the other edge curved or arcuate.

As stated, the cam wheel 30 is mounted on the rear axle 29 so that it has the same motion as the ground wheels 29a, which will be mounted on said axle.

The ratchet wheel 32 which is carried on the rear end roller driving the conveyor belt is of the usual construction, as well as the conveyor belt itself, and the beater cylinder 33, hence they need no further detailed description, the upper run of the endless conveyor 34 traveling rearwardly adjacent to the teeth on the said beater.

Secured to the side board 11 of the bed box is a pin 35 on which is mounted to oscillate a three armed lever, comprising a hub 36 mounted on the pin 35 and the arms 37, 38 and 39, the arm 39 being provided with lateral pins or lugs 39a, the arm 37 is flexibly connected to the rear end of a rod 40 which extends forwardly alongside the side board 11, and is flexibly connected at its forward end to the hand lever 41 disposed adjacent and convenient to the driver's seat 42; the lower end of the hand lever is pivoted at 43 to the side board. The upper end of the hand lever has movement in a keeper which may be provided with means to hold the lever at different degrees of adjustment for regulating the throw of the arms of the lever 36.

Fulcrumed on the pin 35 is a pendant lever 44 by eyes or hubs 45, at the upper end thereof, so that said lever 44 hangs in an approximately vertical position. The body portion of the lever is curved forwardly on a suitable arc, as indicated at 46, and has mounted at its lower or free end a wear or friction roller 47.

To the arm 38 of the lever 36 is attached a link 48 to the lower end of which is flexibly connected the pawl or dog 49, the forward end of which pawl is bifurcated or provided with the ears 50—50 which straddle or pass on opposite sides of the arcuate lever 44 and ride on the curved rib 46a. The rear end of the pawl 49 fits over the ratchet wheel 32, and is constructed to engage the teeth 32a thereof, as usual with this type of pawls or dogs. The rear end of dog 49 is held normally in engagement with the ratchet wheel 32 by a coiled spring 51 one end of which is connected to said dog to pull it downwardly while the opposite end of said spring is connected to a finger or bell crank 52 projecting from the hub of a locking pawl 53, which is pivotally mounted on the side of the box, the nose or point 54 of said pawl resting between the teeth 32a of the ratchet wheel 32 to prevent retrograde movement of said ratchet wheel, yet by yielding, permitting the rearward rotation of said ratchet wheel, and at the same time returning the pivoted arm 44 with roller 47 to position to be driven back by the star wheel 30.

As the wagon is drawn over the field where it is desired to spread the load on the conveyor bed, the hand lever 41 is moved to such position that the lower end of lever 44, which hangs in the plane of the star cam wheel and carrying the friction roller 47 will be in the path of the arms of said cam wheel. As the ground wheels rotate forwardly the tappets engage successively the friction roller and force the lower end of the pendant lever rearwardly and as said lever swings rearwardly on its fulcrum said lever will contact the pawl 49 forcing it rearwardly against the teeth of the ratchet wheel turning it through the desired space, depending on the location of the pawl with respect to the suspension link 48. That is to say, if the three arm lever 36 is oscillated by the adjusting rod 40 to throw the arm 38 downwardly, the pawl 49 will be moved perpendicularly downward on the pendant lever 44 and a longer movement will be given the lever by the tappets of the star cam wheel, and hence the ratchet wheel will be rotated through an arc covered by several of its teeth.

If now, shorter movement of the lever is desired so that a slower movement of the endless conveyor is desired the hand lever 41 will be thrown forward and through adjusting rod 40 and lever arms 37 and 38 and thus raise the pawl perpendicularly against the pendant lever 44 through the link 48. If the hand lever is thrown forwardly still more, the arm 39 will be swung rearwardly, the lateral pins 39a will engage the lever 44 and swing it on its fulcrum, carrying its lower end, having the roller 47, rearwardly entirely beyond the path of the tappets, and thus cause what is known as the "throw-off" of the feed mechanism, and cause stoppage of travel of the conveyor belt.

It will thus be seen that I provide, simple, cheap, and efficient means for varying the feed of a manure spreader, and means by which the feed mechanism can be quickly thrown into and out of action.

While it is desirable in order to secuure good results from the fertilizer applied to the land that it be finely divided and evenly distributed over the ground, which is the office of the beater cylinder 33, it is also desirable to spread manure over an area of greater width than the machine, so that fewer trips of the machine over the field will be necessary to cover the entire area with fertilizer.

This result I secure to a very satisfactory degree by an auxiliary spreader positioned rearwardly of and slightly above the beater cylinder 33, in a position to receive the manure as delivered from said cylinder and further disintegrate and finally deliver the manure rearwardly and laterally of the machine, so that it becomes finally distributed over an area greater in width than the machine.

I therefore equip the rear end of the wagon-box with brackets, each of the brackets including the metal arms 60 which are secured at their lower ends 61 to the side battens 62 by bolt 63; the arms 60 extend rearwardly and upwardly obliquely and have at their free ends bearing eyes 64, which may be simply staples riveted to the arms. These arms 60 are supported in their inclined position by the diagonal brace rods 65 rigidly at one end to the battens 62 and bolted or riveted at their lower ends to said arms 60 as at 66.

In the eyes or bearings 64 are journaled the ends of a shaft 67 by means of the gudgeons 68, and one end of the shaft carries a sprocket wheel 69 which is engaged by a sprocket belt 70 driven from a sprocket on the shaft of the beater and distributer cylinder 33.

This auxiliary spreader in addition to the shaft comprises a number of sheet metal blades 80 which are arranged in a plurality of pairs or sets; each blade is of an irregular or trapezoidal shape, and each pair is supported by and connected to the shaft 67 by steel brackets which comprise the bent arms 81 and 82 the arms 81 being flat and riveted to one face of the blades and the other arms being grooved or curved to fit the periphery of the shaft.

Each pair or set of blades incline oppositely to each other, and the pitch or set of the blades which are positioned substantially diametrically opposite each other with respect to the shaft, incline correspondingly.

It will be noted that the outer or free ends of the blades converge to a point and that these ends incline away from the transverse center of the shaft and also outwardly and away from the longitudinal center of said shaft. Furthermore the blades of each set are inclined oppositely with respect to each other in opposite directions from a common axis. To prevent the material from being thrown upwardly and directly to the rear the end opposite the pointed end is provided with a curved lip 83 which overhangs the working face of the blade, and one long side is also provided with a similar lip 84 similarly shaped and overhanging the work face. This construction practically provides the working face of blades with a shallow pocket. In other words the blades of each pair lie in planes substantially perpendicular to each other.

By the particular shape and relative arrangement of the blades a widely lateral spreading and scattering of the manure is secured, and by inclining the blades with respect to the radial axis of the shaft the catching surface of the blades is increased, and hence the manure is distributed over an area greater in width than the machine.

I claim:

1. In a ratchet feed mechanism for manure spreaders, the combination of a ratchet wheel and its actuating pawl or dog, a series of cam tappets, and means for imparting a feeding movement to said ratchet wheel and pawl, said means including an arcuate pendant lever interposed between said cam tappets and said pawl, and having slidable engagement with said pawl.

2. In a device as herein characterized the combination of a ratchet wheel, a flexibly mounted pawl or dog engaging said ratchet wheel, an oscillatory arcuate lever adapted for slidable engagement throughout its arc with said pawl or dog, a series of tappets for actuating said lever at its free end, and means for adjusting the point of engagement of said dog or pawl with the arc of said lever.

3. In a device as herein characterized, the combination of a ratchet wheel, a flexibly mounted pawl or dog engaging said wheel, a retrograde movement preventing pawl engaging said ratchet wheel and having a resilient connection with said first-mentioned pawl or dog, an oscillatory arcuate lever pivotally mounted at one end and adapted to engage throughout its arc said flexibly mounted ratchet actuating pawl, cam tappets for actuating said lever at its free end, and means for adjusting the point of engagement of said pawl or dog along the arc of said lever.

4. In mechanism for the purpose described, the combination of a ratchet wheel and its actuating pawl or dog, an oscillatory arc-shaped lever engaging said pawl or dog, a multi-armed lever, the fulcra of the oscillating lever and the multi-armed lever being coaxial, a link connection between one of the arms and the aforesaid pawl or dog, an adjusting rod attached to another arm of the lever, to regulate the throw of the pawl, means carried by still another lever arm and adapted to engage the oscillatory lever and swing it out of action, and a star cam tappet wheel adapted to engage the free end of the oscillatory lever to impart successive movements to the said lever and the ratchet actuating pawl or dog.

5. In mechanism for the purpose specified, the combination of a ratchet wheel and its actuating pawl or dog, an oscillatory pendent curved lever, a star cam wheel adapted to successively engage the lower end of said lever and impart a swinging movement thereto, said lever engaging in its curved portion said ratchet actuating pawl, and means for vertically adjusting the point of engagement of said lever and pawl, said means including a link flexibly connected to said pawl and a lever arm, the fulcrum of said arm and oscillatory lever being coaxial.

NICHOLAS HENRY BLOOM.